Jan. 19, 1960 H. P. BOSWAU 2,921,986

CROSSBAR RELAY PRIVATE BRANCH EXCHANGE TELEPHONE SYSTEM

Filed July 15, 1957 8 Sheets-Sheet 1

INVENTOR.
Hans P Boswau
BY
C. A. Gulbrandsen
Atty.

Jan. 19, 1960 H. P. BOSWAU 2,921,986

CROSSBAR RELAY PRIVATE BRANCH EXCHANGE TELEPHONE SYSTEM

Filed July 15, 1957 8 Sheets-Sheet 2

INVENTOR.
Hans P. Boswau

BY
C. A. Gulbrandsen
Atty.

INVENTOR.
Hans P. Boswau
BY
C. A. Gulbrandsen
Atty.

CROSSBAR RELAY PRIVATE BRANCH EXCHANGE TELEPHONE SYSTEM

Filed July 15, 1957 8 Sheets-Sheet 4

INVENTOR.
Hans P. Boswau
BY
C. A. Gullbrandsen
Atty.

INVENTOR.
Hans P. Boswau
BY
C. A. Gulbrandsen
Atty.

CROSSBAR RELAY PRIVATE BRANCH EXCHANGE TELEPHONE SYSTEM

Filed July 15, 1957

8 Sheets-Sheet 6

INVENTOR.
Hans P. Boswau

BY
C. A. Gulbrandsen
Atty.

CROSSBAR RELAY PRIVATE BRANCH EXCHANGE TELEPHONE SYSTEM

Filed July 15, 1957 8 Sheets-Sheet 7

INVENTOR.
Hans P Boswau
BY
C. A. Gulbrandsen
Atty.

CROSSBAR RELAY PRIVATE BRANCH EXCHANGE TELEPHONE SYSTEM

Filed July 15, 1957 8 Sheets-Sheet 8

INVENTOR.
Hans P. Boswau
BY
C. A. Gulbrandsen
Atty.

United States Patent Office 2,921,986

Patented Jan. 19, 1960

2,921,986

CROSSBAR RELAY PRIVATE BRANCH EXCHANGE TELEPHONE SYSTEM

Hans P. Boswau, Los Altos, Calif., assignor to Leich Electric Company, Genoa, Ill., a corporation of Illinois Application July 15, 1957, Serial No. 671,830

24 Claims. (Cl. 179—18)

This invention relates in general to automatic telephone systems, and in particular to attended branch exchange telephone systems employing crossbar switches of the type disclosed in Patent 2,573,889 issued to Hans P. Boswau on November 6, 1951.

These crossbar switches have no relays, and are all identical in construction. Each switch is flat and rectangular in form, with a row of tens-selecting magnets mounted along the vertical front edge of the switch. In a horizontal row across the top edge of the switch from front to rear is a row of five units-selecting magnets, while across the bottom edge is a second row of five units-selecting magnets, with an allotter magnet at the rear. Each switch is approximately 16 inches in height, 7 inches deep, and 1⅜ inches thick.

The line bank conductors of the system consist of stainless steel bars or the like, each supported and insulated from the others by honeycomb-like guide plates of insulating material on the flat side of each switch, which enable the bars to be inserted through corresponding openings in the guide plates of a row of switches mounted side by side on their lower edges. Three such bars are provided for each line, one for the test lead and two for the line leads, and they are jack connected at their inner ends to facilitate withdrawal. Bank springs of Phosphor bronze or the like are provided, one for each horizontal row of bars, each having a row of ten projecting contact fingers for engaging each of the bars of the row, plus an eleventh finger for engaging one of a group of three fixed contacts connected to a three wire switch bus, leading to a link circuit.

Each switch is also provided with ten units lifts, each of which comprises a light metal channel which serves as a frame for an insert of insulating material suitably apertured to correspond with the vertical rows of apertures in the guide blocks. Each lift is suspended for free movement up or down on the contact-finger side of the switch, between a projection on the armature of one of the units magnets inserted in an opening in one end of the lift and a leaf-type restoring spring inserted in an opening in the other end of the lift. In the complete assembly, one of the line bars and one of the flexible contact fingers project through each aperture in the lift, so that when the corresponding units magnet is operated, all of the contact fingers of the corresponding vertical row are pulled into contact with the corresponding line bars of the row. Half of the units lifts are of course arranged for movement upward, and half for movement downward. A similar allotter lift is provided at the rear of the switch for operation by the previously mentioned allotter magnet. When the allotter magnet operates it moves isolated pairs of contact fingers into contact with corresponding pairs of allotter bars, similar to the line bars, to connect the tens and units magnets of the switch to a set of tens and units marking leads common to the system.

Each switch is also provided with ten tens lifts, each of which comprises a tooth-edged block of insulating material mounted on an armature arm controlled by one of the tens magnets mounted on the front edge of the switch. Operation of any tens lift moves the three corresponding switch-bus contact fingers into engagement with the fixed contacts of the switch bus. This connects the corresponding three horizontal rows of line contact fingers also to the switch bus, since each is a part of the same bank spring as the bus finger in the same horizontal row. Then, when a units lift is operated, the corresponding line bank fingers of the row connect the associated line bars also to the switch bus, thereby connecting the corresponding line to a link.

The system here disclosed is assumed to be a 100 line system, including the trunks to the main exchange. The local lines are served by local links each consisting of a link circuit and two crossbar switches of the type described, one of which serves as a linefinder, and the other as a connector switch. Trunk switches of the same type terminate the trunk lines from the main exchange, and are associated with the local line bars in the same manner as the link switches. Certain of the local subscribers can make trunk calls direct, by dialing a single digit such as "0." Other subscribers can make outward calls only through the attendant, who also handles all inward calls.

Since the switches of this system are extremely fast in operation, it was considered desirable to provide the attendant with means for taking advantage of this speed, so that trunk calls might be completed in the least possible time.

It is therefore the principal object of the invention to provide means for operating the trunk switches of the system by means of a keyset in the attendant's turret.

It is another object of the invention to provide a high speed register sender for operation with this keyset, and these switches, so that the attendant may be enabled to handle the largest possible number of trunk calls, with a minimum of delay time between calls.

A feature of the invention is the use of a novel marking type of register sender employing high speed relays and condensers as digit registers for storing the digits of the call numbers as set up by the keyset, with means for transmitting all of the stored digits from the relay register, and for transferring the digits stored in the condenser registers thereto as transmittal proceeds.

Another feature is the means provided for transmitting the stored digits by direct or resistance ground and negative battery markings on one or both conductors of a single pair of marking leads.

Another feature of the invention is the provision of a substitute register sender using only relays as registers, which may be used without change, in place of the foregoing register, to operate the equipment and switches of the system in like manner.

Other objects and features of the invention will be apparent from the following description and claims, when considered together with the appended drawings comprising Figures 1 to 10 inclusive, which illustrate in conventional circuit diagram form sufficient of the equipment embodying the invention to enable the same to be properly described and readily understood.

Figure 1:
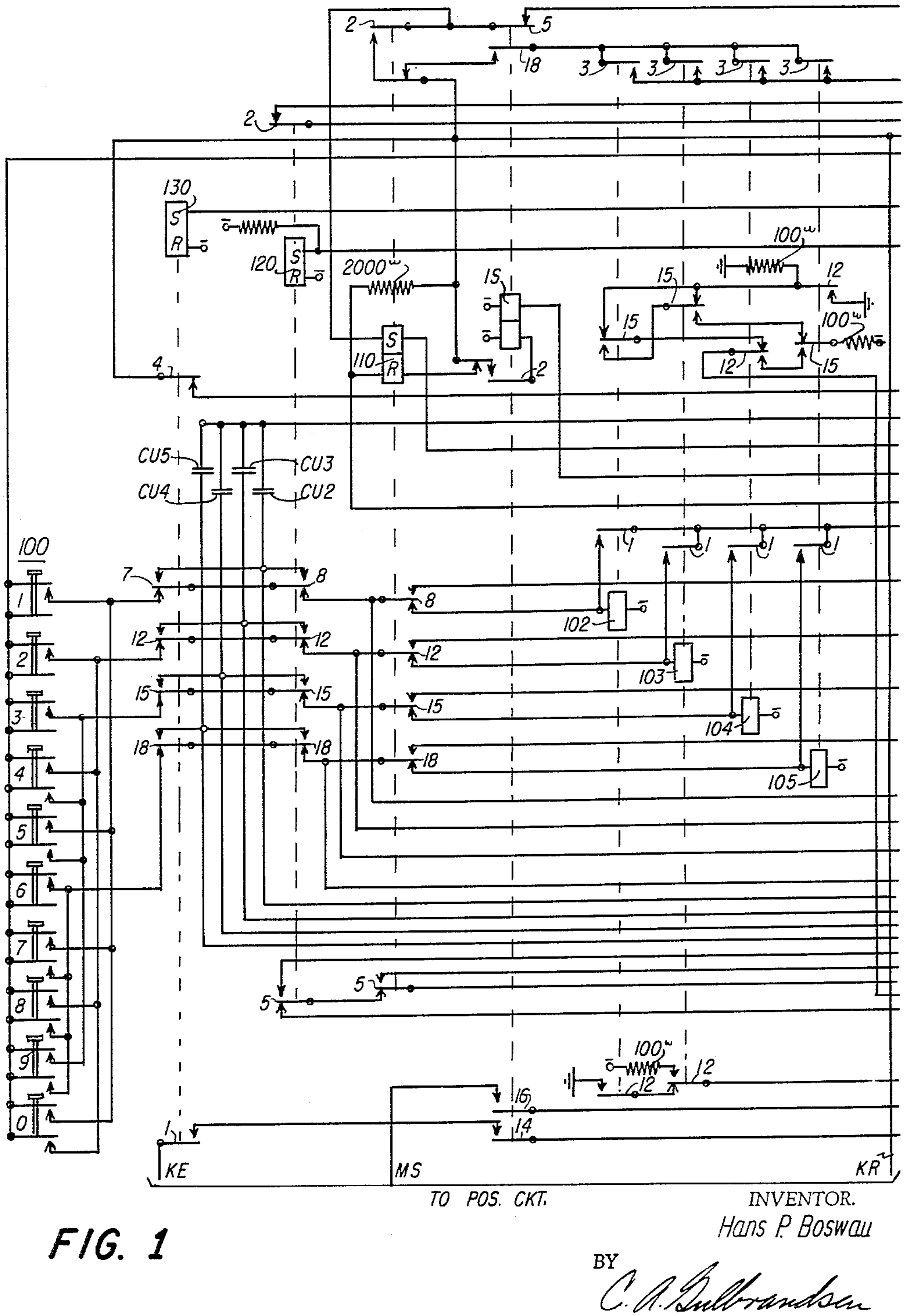
Figs. 1 and 2 show the attendant's keyset and the condenser register sender.
Figure 2:
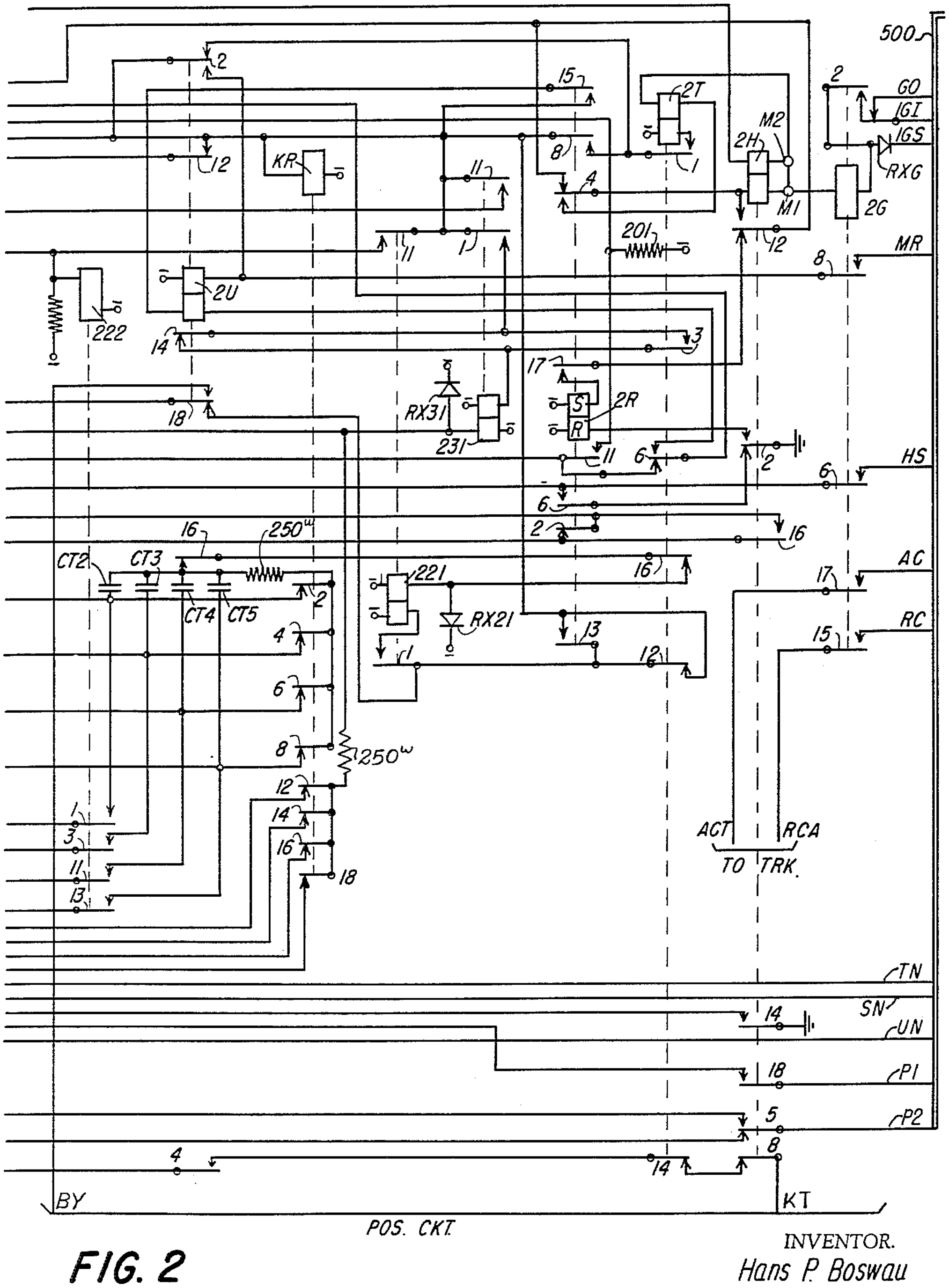
Figure 3:
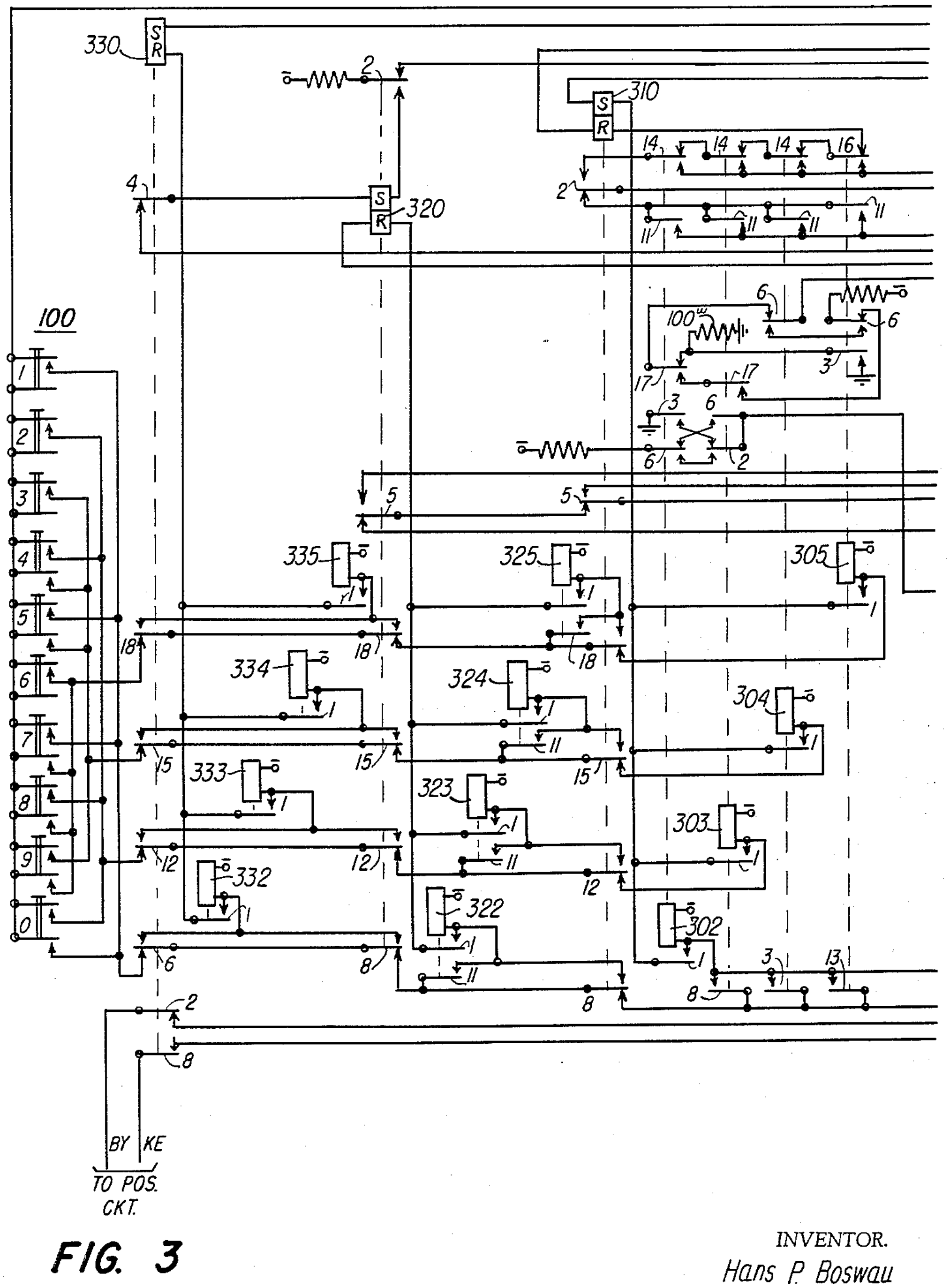
Figs. 3 and 4 show the attendant's keyset and the relay register sender, which latter may be used if desired in place of the condenser register of Figs. 1 and 2.
Figure 4:
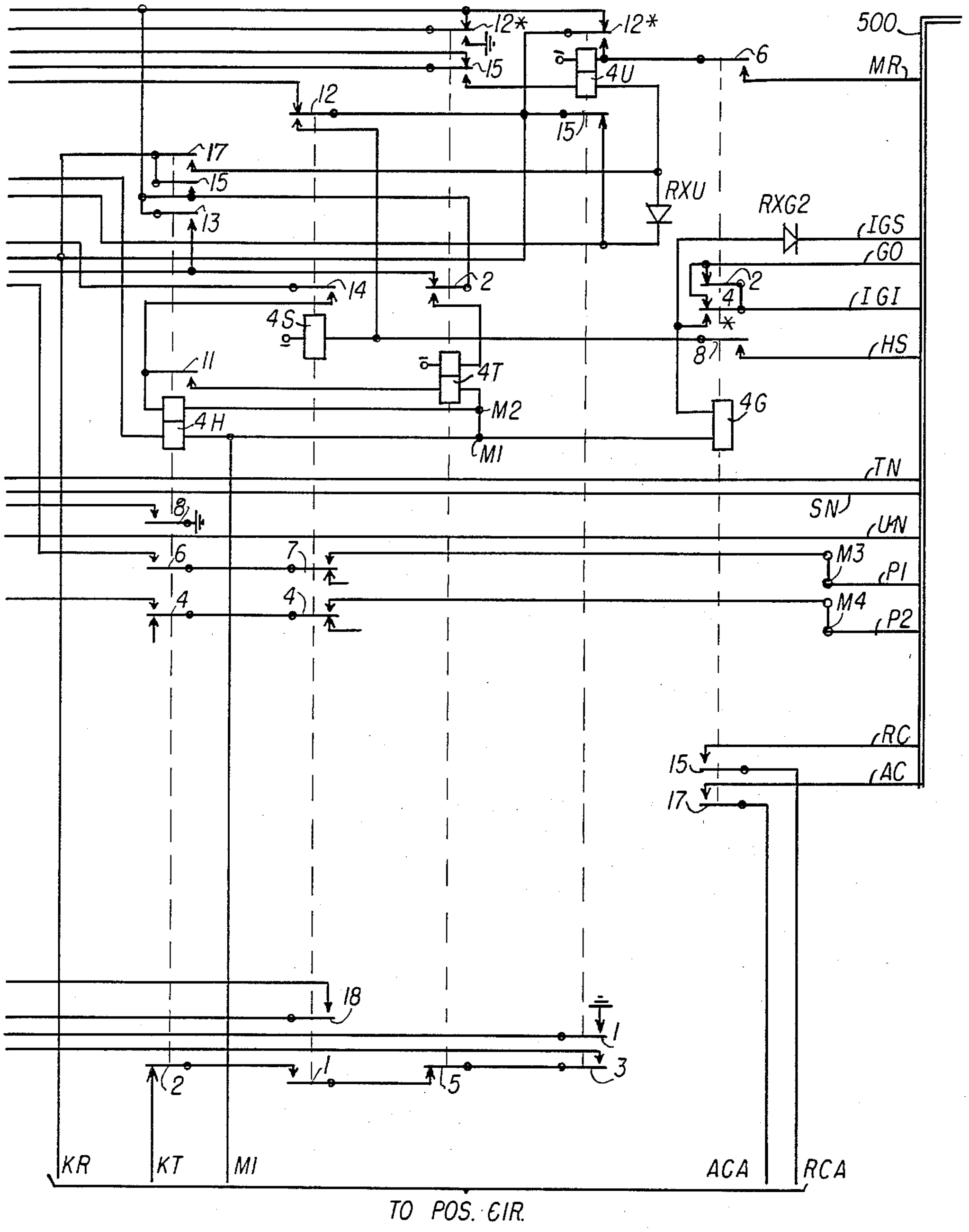
Figure 5:
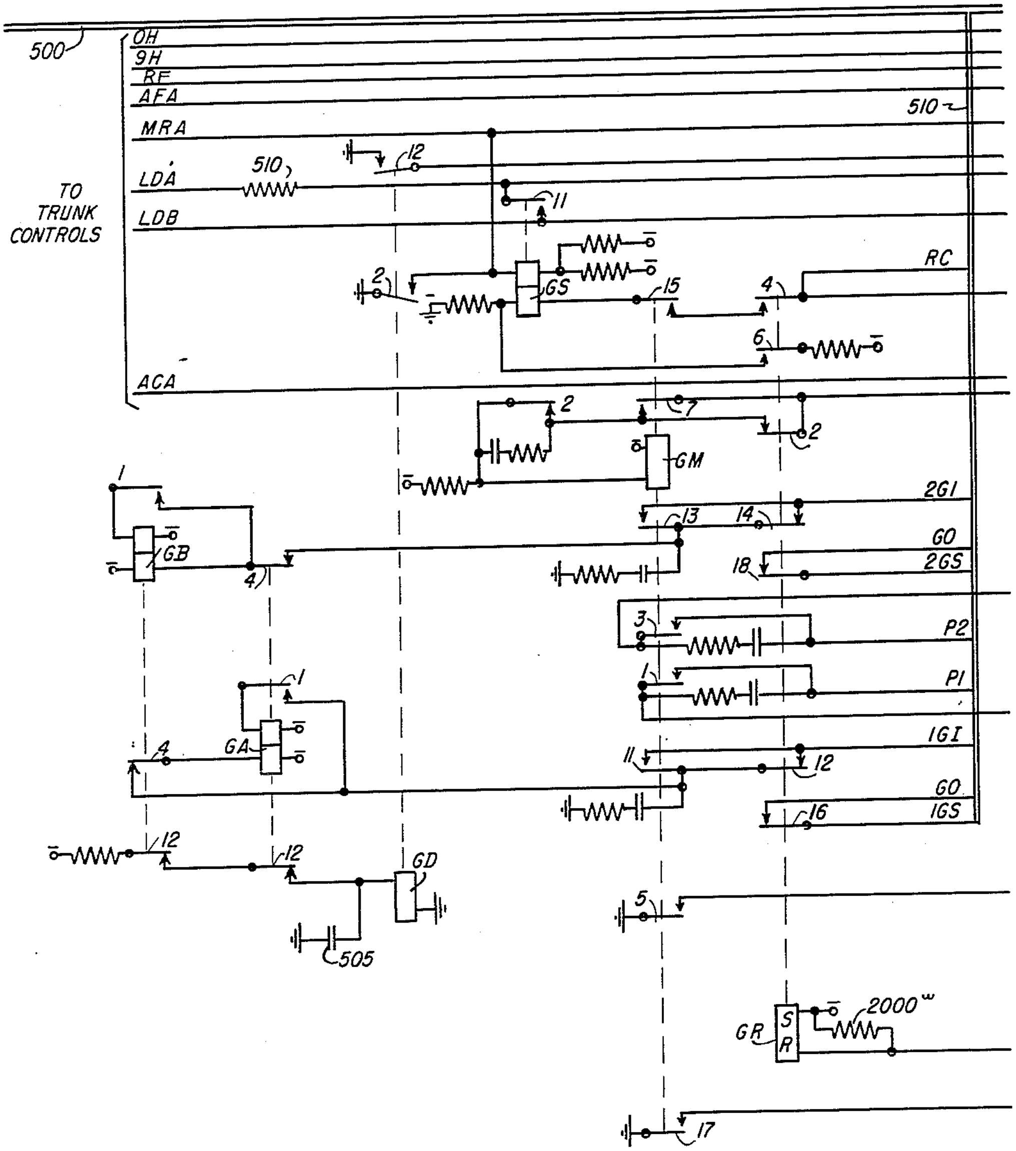
Figs. 5 and 6 show a marker circuit like that shown in Figs. 11 and 11*a* of Patent 2,714,628 issued to Hans P. Boswau on August 2, 1955, which is controlled by the register sender to operate the trunk switches, as well as by the links to operate the link switches.
Figure 6:
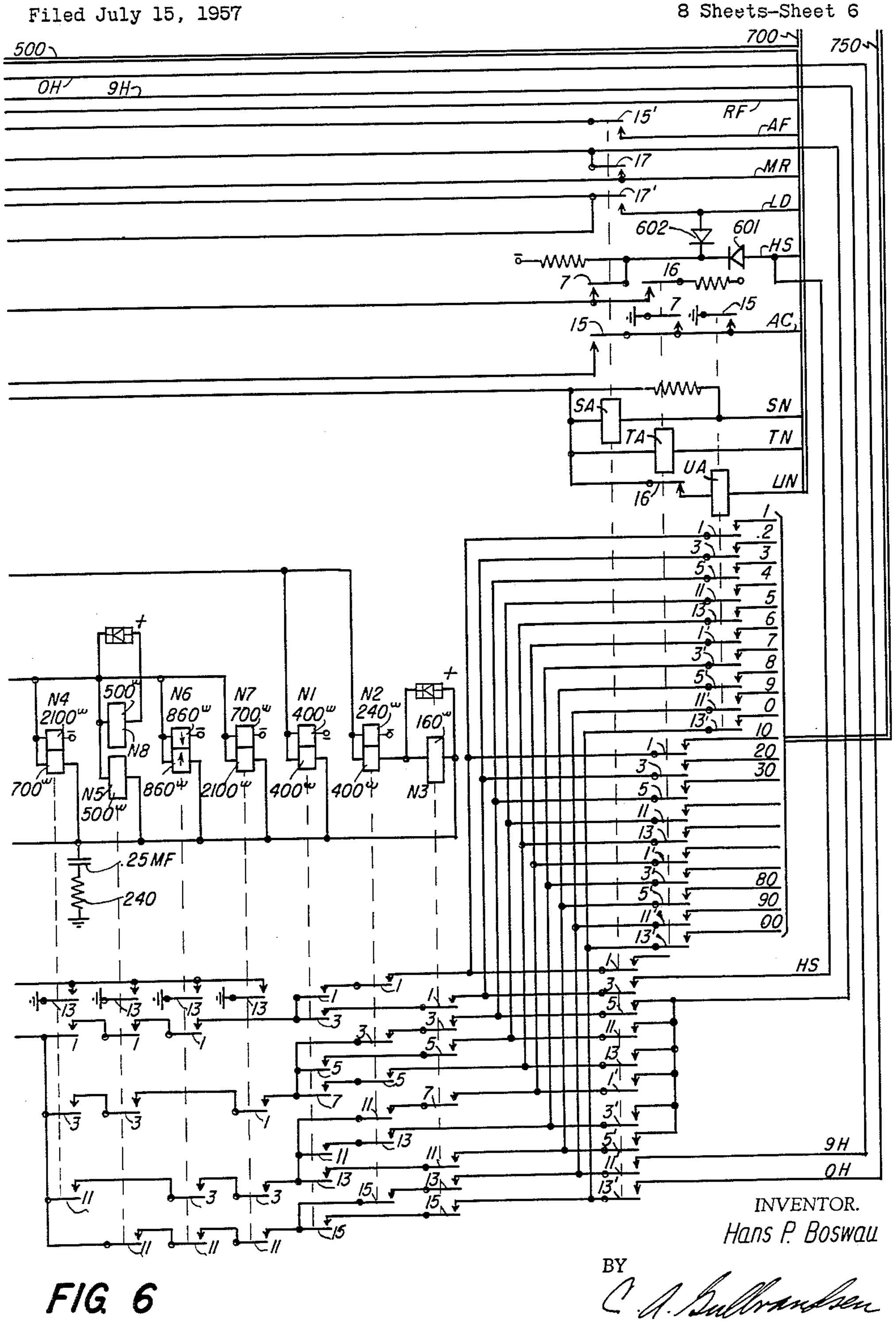
Figure 7:
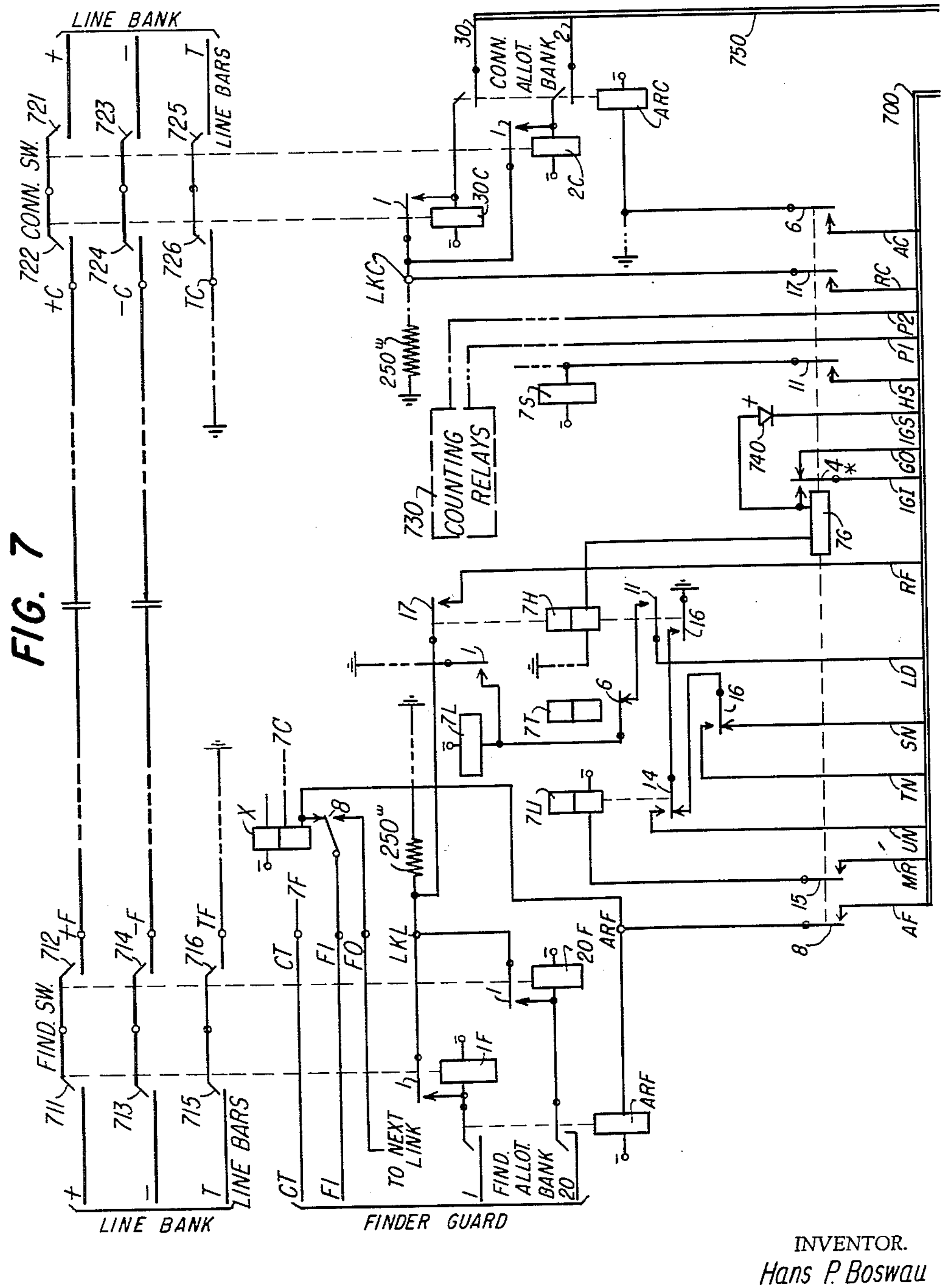
Fig. 7 represents a portion of a finder-connector link similar to that shown in Figs. 15, 16, 17 of the aforementioned Boswau Patent 2,714,628.
Figure 9:
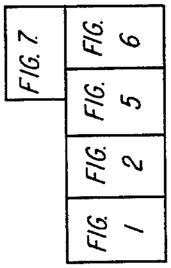
Figure 10:
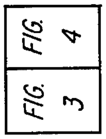

Figs. 9 and 10 show the relationships of the different figures of the drawing with one another, it being understood that when the relay register sender is used, Figs. 3 and 4 will occupy the place indicated for Figs. 1 and 2.

These drawings are in conventional circuit diagram form, with the contacts of each relay directly associated therewith. Contacts marked with an asterisk are make-before-break contacts.

Figure 8:
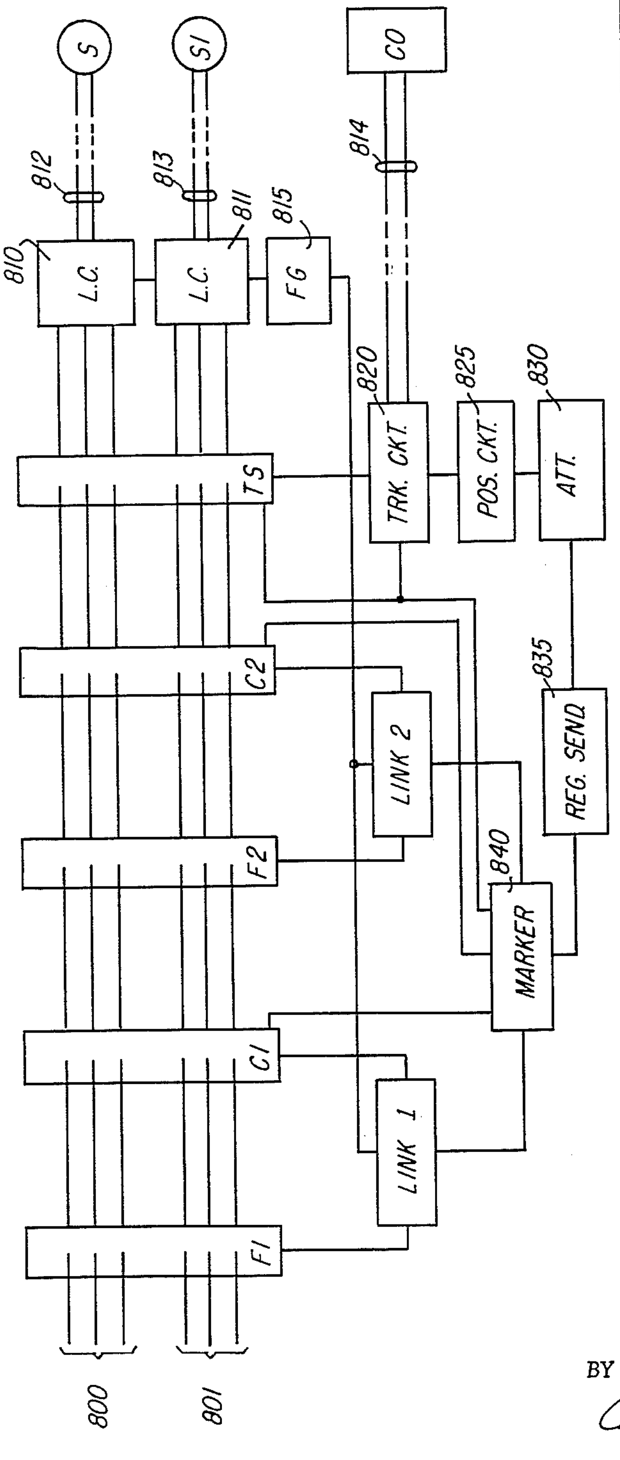
Fig. 8 represents an overall trunking diagram of the system, which shows the relationships of the various units of equipment used in the system.

With reference to Fig. 8, a pair of local stations S and S1 are shown connected to their respective line circuits 810 and 811 over the lines 812 and 813. The line circuits in turn are connected to the associated line multiple bars 800 and 801, and to a finder guard circuit 815, which is connected in turn to the various link circuits, such as Link 1 and Link 2. Associated with Link 1 and Link 2 are the crossbar finder and connector switches F1, C1 and F2, C2 which have access to all of the line bars, including the bars 800 and 801.

Below the subscribers' stations is shown a central office CO which is connected to the branch over a number of trunk lines such as 814, each of which terminates in a trunk circuit such as 820. The trunk circuit in turn terminates on a crossbar trunk switch TS, which is associated with the line bars 800, 801, etc., in the same manner as the link switches. The trunk circuit is also accessible to the attendant via the attendant's turret 830 and the position circuit 825. The turret is also shown connected to the register sender 835.

At the lower left of Fig. 8 is also shown the marker 840 which is common to the system and is shown connected to the link and trunk circuits, and also to the register sender, as well as to the connector and trunk switches.

The general operation of the system with respect to Fig. 8 is as follows.

Assuming first a local call from subscriber S to subscriber S1, the initiation of the call at S operates the line circuit 810 and the common finder guard circuit 815, said line and finder guard circuits being similar to those shown in Figs. 8, 9, 10 of the said Boswau Patent 2,714,628. The finder guard circuit thereupon seizes an idle link, and operates the associated linefinder such as F1, which connects the calling line to the associated link such as Link 1, by way of the line bars 800. The link then returns dial tone, and the calling party S dials the call number of the station S1.

Pulsing and counting relays in the link respond to the pulses, and at the end of each digit, cause the marker 840 to be connected momentarily to the link. The link then transfers the received digit to the marker, which operates the magnets of the connector switch C1 accordingly, and then releases in readiness for the next switching operation. After the last digit, the link is connected through to the line S1 by way of the line bars 801. The called station is then rung from the link, and upon answering is connected to the calling station S by way of line bars 800 and 801 and Link 1.

On a trunk call to the central office from a local station authorized to make such calls direct, the action is identical with that for a local call up to the connection to the link and the return of dial tone. The calling station then dials the trunk call digit "0," whereupon the link again seizes the marker momentarily, and passes the corresponding marking thereto. The marker in turn operates a group of trunk control relays common to the trunks, which may be considered as included in the trunk circuit 820. The trunk control relays thereupon seize an idle trunk circuit such as 820 which operates the allotter magnet of the associated trunk switch TS as well as the allotter magnet of the finder switch of the calling link. The operated tens and units magnets of the finder thereupon operate the corresponding tens and units magnets of the trunk switch over common tens and units marking leads. The link and finder are then released, and the calling line is connected directly to the trunk via the trunk switch and the associated trunk circuit and trunk.

On an inward trunk call, when the central office signals over a trunk, a corresponding lamp signal is displayed on the turret 830. The attendant then connects herself to this trunk via the position circuit 825, by means of the usual key operations, and learns the identity of the wanted local station. She then sets up the call number on the keyset, which number is stored in the register sender, and transmitted thereby to the marker. The marker in turn operates the magnets of the trunk switch, which completes the connection from the trunk direct to the wanted local station.

Restricted lines desiring to make a trunk call may do so by dialing "9" to reach the attendant over an attendant's trunk not shown. The attendant then tells the calling station to hang up, seizes an idle trunk, and dials the wanted city station with a dial also mounted on the turret. When the city station answers, she calls back the local party by means of the keyset and trunk switch as for an inward call, to complete the connection.

The construction of the switches and the general method of operation having been described, a detailed circuit description will now be given, by tracing the circuit operation with reference to Figures 1 to 7, for a number of typical calls, in order to provide a complete understanding of the invention.

*Local call*

When a local subscriber lifts his handset to initiate a call, the associated line circuit at the switchboard is caused to operate and seizes a relay unit called the finder guard unit, which is common to the system. The exact arrangement of the line circuit and the finder guard circuit, which are not shown, is not important, but it may be assumed that they are similar to those shown in Figures 8, 9 and 10 of the previously mentioned Patent 2,714,628. Tens and units relays in the guard circuit corresponding to the calling line now operate, and mark the corresponding tens and units finder marking leads. The guard circuit at the same time grounds the start lead F1 to the first link, shown at the left in Fig. 7 of this application.

If this first link is busy or otherwise unavailable to calls, its X relay will be in the released position and the ground on F1 will pass over lead F0 to the next link. If the first link is available however, its X relay will be in its operated position as shown, this relay being normally locked over its upper winding. The ground on lead F1 accordingly passes through make contacts X–8 and the lower winding of X to relay 7C not shown, which operates, and locks over a second winding. A branch of this circuit also extends to the finder allotter magnet ARF which operates in obvious manner, and connects the finder tens and units magnets to the tens and units marking leads extending from the guard circuit.

Assuming the calling line to be line 21, the illustrated finder tens and units magnets 20F and 1F thereupon operate from the finder guard circuit over the corresponding marking leads. The associated tens and units lifts accordingly close the associated contacts including the contacts 711—716, which connect the speech leads and the test lead of the calling line through to the link. The line and release relays of the link accordingly operate, and lock up the operated tens and units magnets of the finder from ground through 250 ohms. The release relay at the same time passes ground back over the test lead to operate the cutoff relay in the line circuit of the calling line. The latter in turn releases the calling subscriber's line relay, to clear the calling line for dialing and speech.

The line circuit at the same time releases the finder guard circuit to make it available for further calls, and the latter removes ground from the start lead F1 and from the tens and units marking leads. Responsive to the opening of the F1 lead relay X in the link releases, its locking winding having been opened upon the seizure of the link, and allotter magnet ARF also releases. Relay X thereupon extends the start lead to the next link, and the allotter magnet disconnects the marking leads from the finder tens and units magnets, the operated ones of which are now locked to the link, over contacts 1F–1 and 20F–1.

The line relay (not shown) in the link is now held over the calling line loop by way of finder contacts 711—714 and the associated line bars, and the link returns dial tone to the calling party over the same path. The calling party then dials the call number of the wanted party in the usual way, which will be assumed as being "232," of which the first digit is a prefix digit indicating a local call.

The link line relay, not shown, responds to the pulses, and operates a set of counting relays 730, which thereupon connect ground through 100 ohms to marker lead P1, battery through 100 ohms to marker lead P2, and direct ground to the lower winding of link relay 7H. The latter ground tests the marker over the GI—GO chain which extends through the marker and all of the links and trunks via series break contacts, to ensure that only one unit of equipment can seize the marker at a time.

If the GI—GO chain is intact and the marker is free, that fact will be indicated by the presence of battery on the GS lead to the link, from battery through the lower winding of marker relays GA or GB, which are associated with different groups of links. Assuming the link of Fig. 7 to be in the group associated with GA, link relays 7G and 7H and marker relay GA will now operate in series in the following circuit: battery through the lower winding of relay GA, break contacts GB–4, GR–12, lead 1GI to Fig. 7, the GI—GO chain through the various links and trunks and back to break contacts GR–16 in the marker and lead 1GS to the link of Fig. 7, where it passes through 7G and 7H tothe previously mentioned ground from the counting relays. Relay 7G upon operating, at break contacts 7G—4 opens the GI—GO chain momentarily to block other selections, at make contacts 7G—4 locks direct to marker lead 1GI to hold GA, and at its other contacts connects a number of other marker leads to the link. Relay 7H at the same time grounds marker lead SN.

Marker relays SA and GM now operate in series in the circuit: ground, contacts 7H—16, 7U—14, 7T—16, lead SN in cable 700, winding of SA, contacts GR–2, GS–2, winding of GM, and battery. Relay SA thereupon closes various preparatory circuits, while relay GM at contacts GM–7 and GM–11 closes holding circuits for itself and relay GA, independently of relay GR, at contacts GM–1 and GM–3 connects the link leads P1 and P2 to the code relays N1—N8, and at contacts GM–5 connects direct ground to the other side of the code relays.

With ground through 100 ohms on lead P1 and battery through 100 ohms on lead P2, code relays N4, N5, N6, N1, N3 operate. Marker relay GR thereupon operates from contacts N4—13, N5—13 and N6—13 in obvious manner. The code relays at the same time also operate link relay 7S to mark the call as local, over the circuit: ground, contacts GM–17, N4—1, N5—1, N6—1, N1—3, N3—1, SA–3, lead HS in cable 700, contacts 7G—11, winding of relay 7S, and battery. Upon the operation of relay GR, relay GS operates in a branch of the foregoing circuit extending from lead HS in Fig. 6 through disc rectifier 601, contacts SA–7, GR–4, GM–15, lower winding of GS, and contacts GR–6 to battery. This same ground is now also extended to the link over lead RC, but this is without effect in the present instance.

Marker relay GS upon operating, at contacts GS–2 unlocks and releases relays GM and SA. This causes the release of the operated code relays N, and opens the circuit to relay 7S, which is now held from the link. Relay GM also, at contacts GM–11 opens the series circuit through marker relay GA and link relays 7G and 7H which release. The release of 7G frees the marker from the link, and the release of the marker code relays opens the circuit to GR. Relay GR then releases, reclosing the GI—GO chain and restoring the marker to normal condition, ready for re-seizure by the same or another call. Relay GR is made slightly slow to release, to ensure complete release of the marker.

The second digit "3" causes the counting relays in the link to count off three steps, where they place no ground or battery markings of any kind on the P1 and P2 leads. The link does cause the operation of relay 7T however, and grounds the lower winding of relay 7H. Relays 7H, 7G and GA operate in series as before, over the GI—GO chain, whereupon 7G again locks, and opens the chain. Relay 7H at the same time grounds marker lead TN.

Marker relays TA and GM now operate in series over the circuit: ground, contacts 7H—16, 7U—14, 7T—16, lead TN, winding of TA, contacts GR–2, GS–2, winding of GM, battery. Relay TA prepares the tens marking leads to the connector, and at TA–7 operates the connector allotter magnet ARC over lead AC in the cable 700 and contacts 7G—6. Relay GM at the same time connects the P1 and P2 leads to one side of the code relays N as before, and connects ground to the other side of these relays.

With no markings of the P1, P2 leads, the code relays N4, N5, N7, N2, N3 operate. The code relays thereupon operate marker relay GR, thereby opening another point in the GI—GO chain as before. The code relays at the same time operate the connector tens magnet 30C in the following circuit: ground, contacts GM–17, N4—3, N5—3, N7—1, N2—3, N3—3, TA–5, lead 30 in cable 750, contacts of alotter magnet ARC, and the winding of magnet 30C to battery.

Tens magnet 30C upon operating, causes its tens lift not shown to operate the associated bank contacts, including the illustrated contacts 722, 724, 726, to select the tens group of the called line. Magnet 30C at the same time closes its locking contacts 30C—1. It thereby extends its own operating ground to marker relay GS, via contacts 7G—17, lead RC in the cables 700, 500, 510, contacts GR–4, GM–15, winding of GS, contacts GR–6, battery. Relay GS accordingly releases GM and TA, which open the operate circuits to relays GA, 7G, 7H, GS, the code relays, and tens magnet 30C. These relays accordingly release, but the tens magnet 30C remains locked to resistance ground in the link. Relay GR then releases, and restores the marker to normal condition, as before. Link relay 7U also operates at this time, and locks.

The third digit "2" causes the counting relays 730 to again count off two steps and connect ground through 100 ohms to lead P1 and battery through 100 ohms to lead P2, and direct ground to relay 7H. If the marker is free, or as soon as it is available, relays 7H, 7G, and GA operate in series as before. Relay 7G again opens the GI—GO chain and locks to the 1GI lead as before, while relay 7H now grounds the UN lead to the marker.

Marker relays UA and GM now operate in series over the circuit: ground, contacts 7H—16, 7U—14, lead UN, winding of UA, contacts GR2, GS–2, winding of GM, and battery. Relay UA prepares the units marking leads to the connector, and at contacts UA–15 grounds lead AC to re-operate the connector allotter magnet ARC, while relay GM at the same time connects the P1 and P2 markings and direct ground to the marker code relays as before.

With 100 ohm ground on lead P1 and 100 ohm battery on lead P2, code relays N4, N5, N6, N1, N3 now operate, as for the first digit "2," and again operate relay GR. The code relays at the same time now operate the connector units magnet 2C, over the following circuit: ground, contacts GM–17, N4—1, N5—1, N6—1, N1—3, N3—1, UA–3, lead 2 in cable 750, contacts of alotter magnet ARC, and the winding of magnet 2C to battery.

Units magnet 2C upon operating, causes its units lift not shown, to operate the associated bank contacts, including the illustrated contacts 721, 723, 725, and the latter contacts connect the link to the line bars of the called line. Magnet 2C at the same time closes its contacts 2C—1, and thereby connects its own operating ground to lead RC, thereby operating marker relay GS over the lead RC and cables 700, 500, and 510. Relay GS thereupon releases relays GM and UA, and the latter release relays GS, GA, 7G and 7H, and open the operate circuit to units magnet 2C. Magnet 2C is now locked to resistance ground in the link, and is not affected. Marker relay GR then releases, and restores the marker to normal.

The link circuit, following the operation of the units magnet, extends ground over the test lead of the called line to operate the cutoff relay in the associated line circuit not shown, and thus clear the called line of attachments. The link then rings over the called line loop, and when the called party answers, cuts off the ring and completes the connection, in known manner.

*Trunk call from a non-resricted line*

Trunks from the central office, as previously indicated, terminate on trunk switches. Certain local parties can make outward calls over these trunks with the aid of a local link, by dialing the single digit "0." The other local parties may make outgoing calls only through the attendant. Whenever a link is seized by a restricted line, the finder-guard circuit grounds the CT lead in Fig. 7, and operates a restriction relay 7F not shown, in the link. If the restricted line should now attempt a trunk call by dialing "0," the link will not respond, but will simply return busy tone.

If the calling line is a privileged line however, the link restriction relay 7F will not be operated, and the dialing of the digit "0" will cause the counting relays of the link to connect battery through 100 ohms to each of the leads P1 and P2. The link will also at the same time connect ground to relay 7H. Link relays 7H and 7G and marker relay GA accordingly operate over the GI—GO chain as before, to seize the marker. Relay 7H at the same time operates marker relays SA and GM in series over lead SN, and relay GM connects the code relays N to the P1 and P2 leads and to ground. The 100 ohm battery on the P1 and P2 leads now causes the operation of the code relays N5, N6, N7, N1, N3.

The code relays upon operating, operate GR as before, and at the same time connect ground to the trunk control lead OH, by way of contacts GM–17, N5—11, N6—11, N7—11, N1—15, N3—15. The ground on lead OH operates a group of trunk control relays not shown, which are common to the trunks. The trunk control relays in turn, ground a chain start lead to the trunk circuits. This start ground then causes seizure of the first idle trunk in a manner similar to that described for the seizure of a link over the F1 lead.

The seized trunk circuit now operates the allotter magnet of the associated trunk switch, while the trunk control circuit connects ground to the RF, AFA and LDA leads to the marker. The ground on lead RF passes over cable 700 to the held link, and through contacts 7H—17 and the locking contacts such as 20F—1 and 1F—1 of the operated finder tens and units magnets, thereby placing direct ground on the windings of these magnets, in place of the normal 250 ohm holding ground, which is now in parallel with this circuit. The ground on lead AFA at the same time operates the finder allotter magnet ARF, by way of contacts SA–15′, lead AF in the cable 700, and contacts 7G—8.

Upon the operation of the finder allotter magnet ARF therefore, the direct ground from lead RF on the operated tens and units magnets of the finder is extended to the corresponding tens and units marking leads, which are common to the finders and the trunk switches. The corresponding tens and units magnets of the trunk switch accordingly operate in these circuits, in parallel with the finder tens and units magnets, lock to resistance ground in the trunk circuit, and connect the calling line to the trunk.

Meanwhile, the ground on lead LDA has been extended through resistor 510 in the marker and contacts SA–17′ to lead LD, and thence over cable 700, contacts 7H—11 and 7T—6 to link relay 7L which operates and locks to direct ground at make contacts on the link release relay not shown. This direct ground is accordingly passed back to the marker over the same lead LD in the cable 700 and operates marker relay GS, by way of rectifier 602, and contacts SA–7, GR–4, GM–15 and GR–6. Relay GS operates in this circuit, and starts the release of the marker. Relay 7L at the same time, disconnects the line relay of the link from the calling line, and the latter relay opens the circuit of the link release relay, which also releases after the usual delay period. The release relay in turn opens the locking circuits of relay 7L and the finder tens and units magnets. The finder allotter magnet releasing at the same time due to the release of the marker, the finder tens and units magnets release, and complete the release of the link, leaving the calling station connected only to the trunk through the trunk switch.

*Trunk call from a restricted line*

As previously indicated, restricted lines cannot make trunk calls direct to the central office. They can however have such calls extended by the attendant. For this purpose an attendant's trunk is provided, which terminates in a line circuit, and enables the local subscribers to call the attendant, by way of a local link, by dialing a single digit number, such as "9."

The counting relays 730 in the link respond to the pulses, and place battery through 100 ohms on lead P1, and nothing on lead P2. The link at the same time connects ground to relay 7H as before. Relays 7H, 7G now operate as before over the GI—GO chain, in series with marker relay GA (or possibly GB). Relay 7H then grounds the SN lead to operate marker relays SA and GM, and the latter closes the circuits to the code relays N.

With 100 ohm battery on the P1 lead and no marking on the P2 lead, code relays N5, N6, N7, N2, N3 now operate, and operate GR. They also ground lead 9H to the trunk control circuits, by way of contacts GM–17, N5—11, N6—11, N7—11, N2—15, N3—13 and SA–11′. The trunk control relays (not shown), in response to the ground on lead 9H, ground the appropriate tens and units connector marking leads, and connect ground to marker lead ACA. This last ground now operates the connector allotter magnet ARC via contacts SA–15, lead AC, and cable 700. The required tens and units magnets thereupon operate in the connector switch, and connect the calling station to the attendant's trunk, which lights a corresponding signal lamp in the attendant's turret. The link at the same time passes ground back over lead RC as before to operate the marker release relay GS, which releases the marker and the link guard relays 7G and 7H.

The attendant answers by operating a talk key in the turret (not shown), and upon being given the call numbers of the calling local party and the wanted city party, tells the local party to hang up, and releases her end of the attendant's trunk. The attendant then seizes an idle city trunk, by way of the position circuit, thereby busying the trunk at both ends, and lighting a keyset lamp not shown.

The attendant now taps out the number of the calling local party on her keyset (Figs. 1 or 3), which is mounted on the turret. The three digits of this number are stored momentarily in the registers associated with the keyset, in a manner to be explained more fully in the next section. From the storage registers, regardless of whether Figs. 1 and 2, or Figs. 3 and 4 are involved, the digits of the call number are passed successively over the leads P1 and P2 to the marker of Figs. 5 and 6, where they cause operation of the code relays N. The latter in turn operate the required tens and units magnets of the trunk switch and thereby connect the trunk direct to the calling line. The register then causes the trunk circuit to ring the calling party, who then comes back in on the line. The attendant then dials the wanted city station, by means of an impulse dial which is also mounted on the turret, and completes the connection in the usual way. Due to the speed of the keyset operation, the city station can be called first, if preferred.

*Inward trunk calls (Figs. 1 and 2)*

All calls from the central office are extended by the attendant. When the central office signals over a trunk, a corresponding signal lamp lights in the turret. The attendant then comes in on the trunk with the aid of an associated talk key in the turret, and talks with the city party. On learning the identity of the wanted local party, the attendant quickly taps out the call number of the wanted local station on the keyset 100 in Fig. 1. As a matter of convenience, this number will be assumed to be "232" as in the local call previously described.

When the position circuit, not shown, is associated with the trunk, it grounds lead KR shown at the lower right in Fig. 1 and operates relay KR (Fig. 2). When now, key 2 in the keyset is struck for the first digit, relay 103 of the 1st digit register operates from the ground on lead KR through contacts 2U—12, key 2, and contacts 130—12, 120—12, and 110—12. Relay 103 thereupon, at contacts 103—1 prepares a circuit to the lower winding of relay 110, now shunted by ground on both of its terminals. When key 2 is released the shunt is removed, and relay 110 operates in series with relay 103 and locks the latter operated, from the ground on lead KR through contacts 1S—2, lower winding of relay 110, contacts 2R—2, 103—1, and relay 103 to battery. Relay 110 upon operating, disconnects relays 102, 103, 104, 105 of the 1st digit register from the keyset, and connects the keyset to condensers CT2, CT3, CT4, CT5 of the 2nd digit register. Relay 110 remains operated until the 2nd digit is registered or the 1st digit is sent.

When key 3 of the keyset is struck for the 2nd digit, condenser CT4 is charged instantaneously from the ground on lead KR through contacts 2U—12, key 3, contacts 130—15, 120—15, 110—15, condenser CT4, contacts 2U—16, 2T—16, and rectifier RX21 to battery. The upper winding of relay 221 is also in this circuit but is shunted by the rectifier, and the relay does not operate. Upon the release of the key however, relay 221 operates from a partial discharge of the condenser, at contacts 221—11 operates relays 120 and 222 in parallel, from the grounded lead KR, and at contacts 221—1 locks through contacts 2T—12 to lead KR. Relay 221 remains locked until the 3rd digit is registered or the 2nd digit is sent. Relay 222 prepares transfer circuits for the stored 2nd digit, and relay 120 disconnects the keyset from the condensers of the 2nd digit register, and connects it to the condensers CU2, CU3, CU4, CU5 of the 3rd digit register, shown just below relay 120.

When key 2 of the keyset is struck for the 3rd digit, condenser CU3 is charged from the ground on lead KR, through the key, break contacts 130—12, make contacts 120—12, condenser CU3, and rectifier RX31 to battery. Upon the release of the key a partial discharge of the condenser through the lower winding of relay 231 causes this relay to operate in the same manner as relay 221. Relay 231 locks to lead KR over contacts 2U—14 and 231—1, and remains locked until all the stored digits have been sent. Relay 231 also, at its contacts 231—11 operates relay 130, from the grounded lead KR, and the latter relay disconnects the keyset from the registers.

Returning now to the operation of relays 103 and 110 responsive to the first operation of the keyset for the first digit "2," contacts 110—2 upon operating prepare a seizure circuit to the marker through relays 2H and 2G. If the GI—GO chain is closed at this time, relays 2H and 2G operate in series with marker relay GA, in the following circuit: grounded lead KR, contacts 110—2, 1S—5, windings of relays 2H and 2G in series, rectifier RXG, lead 1GS in cables 500 and 510, contacts GR–16, the GI—GO chain through the links and trunks and back to marker lead 1G1, contacts GR–12 and GB–4, and the lower winding of GA to battery. Relay GA locks, disconnects GB, and opens the circuit to timing relay GD momentarily. Relay 2G locks to the 1G1 lead, opens the GI—GO chain, and prepares a circuit to relay 1S. Relay 2H at contacts 2H—2 operates relay 2R, at contacts 2H—18 and 2H—5 connects the P1 and P2 leads to marking contacts on the register relays 102—105, and at contacts 2H—14 grounds lead SN.

Marker relays SA and GM now operate in series in the circuit: ground, contacts 2H—14, 110—5, lead SN in cables 500 and 700, winding of SA, and contacts GR–2 and GS–2 to battery through GM. Relay GM accordingly connects the code relays to the P1 and P2 leads, which now have ground and battery through 100 ohms on them from the register circuit. The circuit for P1 is from ground through 100 ohms on break contacts 102—15 through break contacts 104—12, make contacts 2H—18, lead P1 in cables 500, 510, and make contacts GM–1 to the code relays. The circuit for P2 is from battery through 100 ohms on make contacts 103—12, through make contacts 2H—5, lead P2 in cables 500, 510 and make contacts GM–3 to the code relays.

Code relays N4, N5, N6, N1, N2 accordingly operate as before, and ground lead HS and operate relay GR. The ground on HS operates marker relay GS over contacts SA–7, GR–4 and GM–15. The same ground is also extended over a multiple of lead HS in cables 700 and 500 to the register circuit, where it operates relay 1S, by way of make contacts 2G—6. Relay 1S at contacts 1S—2 locks to lead KR and opens the series circuit through the lower winding of relay 110 and relay 103. Relay 1S also, at contacts 1S—5 opens the series circuit through relays 2H, 2G and GA to release these relays and the marker. Relay 2H also opens the circuit to relay 2R which releases after a slight delay due to being made slow to release. Relays 103 and 110 also release, upon the operation of 1S, provided the 2nd digit is already registered. If it is not, relay 103 alone will release, while relay 110 will hold in the following circuit: KR ground, make contacts 110—2, upper winding of relay 110, break contacts 2T—6, break contacts 120—2, resistor 201, and battery. A branch of this circuit also extends to resistor 201 over make contacts 2R—11, as long as relay 2R is operated. The marker is thus released at once, but the register circuit may be required to wait briefly, depending on the speed with which the keys are struck.

Upon the release of register relay 110, under either condition, the condensers CT2 to CT5 of the 2nd digit register are connected to the relays 102 to 105 of the 1st digit register, via make contacts of relay 222 and break contacts of relay 110. Charged condenser CT4 is thereupon further discharged through relay 104, which operates in a circuit including the upper winding of relay 221, contacts 2T—16, 2U—16, condenser CT4, contacts 222—11, 110—15, and the winding of relay 104.

With relay 110 normal and relays 1S and 104 operated, the marker seizing circuit is again prepared, from KR ground through contacts 110—2, 1S—18, 104—3, 2R—4, and the lower winding of relay 2H. If the marker is free and the GI—GO chain intact, relays 2H, 2G and GA operate in series as before. Relay 2H prepares the P1, P2 circuits, at contacts 2H—14 grounds the TN lead to the marker, and at contacts 2H—2 re-operates relay 2R. With relay 2R operated, relay 2H also at contacts 2H—12 operates relay 2T in parallel with itself, by way of make contacts 2R—4 and the upper winding of 2T. Relay 2T thereupon locks to lead KR via contacts 2T—1 and 2U—2, and opens its circuits to relay 221 which holds however from 2R—13 until the marker releases.

Meanwhile, marker relays TA and GM have operated in series over the TN lead, from ground at 2H—14, through breaks 110—5 and makes 120—5, and lead TN in the cables 500 and 700, and relay GM again completes the P1 and P2 circuits. With register relays 102, 103, 105 normal, and relay 104 operated, there will be no marking on either the P1 lead or the P2 lead, and the marker code relays N will have only ground connected to them, from contacts GM-5.

Code relays N4, N5, N7, N2 and N3 accordingly operate and ground tens lead 30 from ground through contacts GM-17, N4—3, N5—3, N7—1, N2—3, N3—3, and TA-5. The code relays also operate GR to prepare the release of the marker as before. Meanwhile, the operation of marker relay TA has grounded lead AC at contacts TA-7. This ground passes over a multiple of lead AC in the cables 700 and 500 to Fig. 2, where it is extended through make contacts 2G—17 to lead ACT to the trunk circuit not shown, for the operation of the trunk switch allotter magnet. Tens magnet 30 of the trunk switch now operates quickly from the grounded tens marking lead, which, with the other tens and units marking leads of the marker, is multipled to the trunk switches.

Tens magnet 30 upon operating, extends its own operate ground back over lead RCA to the register, and thence over contacts 2G—15 to lead RC, through cables 500 and 510, contacts GR-4 and GM-15 and the winding of GS to battery through contacts GR-6. Relay GS operates in this circuit, and at GS-2 releases GM and TA. Relay TA opens the marking leads, and at TA-7 releases the trunk switch allotter magnet, while relay GM releases the code relays, and opens the circuit to GS, and the series circuit through marker relay GA and register relays 2G and 2H, which also release. Relay 2G thereupon disconnects the marker, and relay 2H releases relays 104 and 221, with the latter releasing relays 120 and 222. If the last digit has not yet been registered however, relay 221 will remain locked to KR ground through break contacts 2U—18 and 130—4 until it is, and will of course hold relays 120 and 222. Register relay 2R and marker relay GR finally release, after the usual slight delay.

Upon the release of register relay 222, the tens condensers CT2 to CT5 are disconnected from register relays 102 to 105, and upon the release of relay 120, the relays 102 to 105 are connected to the units condensers CU2 to CU5. With relay 130 operated and relays 120 and 110 normal, charged condenser CU3 now discharges through relays 231 and 103, by way of make contacts 130—12, and break contacts 120—12 and 110—12. Relay 103 operates quickly in this circuit, and connects KR ground to relays 2H and 2G, via contacts 110—2, 1S—18, 103—3, and 2R—4.

If the GI—GO chain is closed and the marker is free, relays 2H, 2G and GA operate in series as before, and block other selections temporarily. Relay 2H now grounds the UN lead to the marker, from ground at 2H—14, through break contacts 110—5 and 120—5, and also re-operates 2R, from ground at 2H—2. With relays 2R and 2T now operated, a circuit for relay 2U is closed as follows: KR ground, contacts 2R—15, lower winding of 2U, contacts 2T—6, 120—2, resistor 201, and battery. Relay 2U operates and locks, removes ground from the keyset, prepares the release of relays 2T and 221 and prepares the test circuits.

Upon the grounding of lead UN by contacts 2H—14, marker relays UA and GM operate in series, over the cables 500 and 700. Relay UA connects the units marking leads to the marker, and grounds the AC lead to the register, to again operate the trunk switch allotter magnet, over lead ACT. Relay GM connects leads P1 and P2 to the code relays, of which N4, N5, N6, N1 and N3 operate, as for the first digit. The code relays accordingly ground the multipled units marking lead 2 which operates units magnet 2 in the trunk switch. The trunk switch accordingly makes connection with the called line, and returns ground over leads RCA and RC as before, to operate marker relay GS, which releases the marker.

Upon the release of the marker, register relays 2G and 2H restore, and release relays 103 and 2R. Relay 2R releases 2T which releases 231. Relay 231 then releases 130, which like 2R is slow to release. The trunk switch allotter magnet of course also releases on the release of the marker.

During the interval between the release of relays 2T and 130, a test circuit is closed at contacts 2T—14 to determine the busy or idle condition of the called line. This circuit extends from the test lead TC of the called line back through the trunk switch, and thence over a lead KT through the trunk and position circuits to the register, where it now extends over contacts 2H—8, 2T—14, 2U—4, 1S—14, and 130—1 to lead KE, which is connected to the trunk and position circuits. A pair of relays in the trunk circuit thereupon operate and lock, extinguish the keyset lamp and ring the called line. The attendant now restores the talk key, while the position circuit removes ground from lead KR. Register relays KR, 2U and 1S thereupon release and complete the release of the register. The attendant receives various flashing and steady lamp signals controlled from the trunk circuit as indications of ringing, answer, and disconnect, and acts accordingly.

If the called line is busy, ground rather than battery is returned over the line test circuit, thereby preventing the operation of the ringing relays of the trunk circuit. Accordingly when relay 130 releases, with relay 2U still operated, KR ground is passed to the position circuit over break contacts 130—4, make contacts 2U—18 and lead BY, and causes the position circuit to give the busy signal to the attendant. The attendant may then break in and offer the call, in known manner, or she may advise the city caller that the line is unavailable, and release the trunk.

Upon the release of relay KR the condensers CT2 to CT5 are short circuited through a 250 ohm resistor by break contacts KR-2 to KR-8, while condensers CU2 to CU5 are similarly short circuited by break contacts KR-12 to KR-18. Any remaining charge on the condensers drains off quickly in these circuits to place the equipment in complete readiness for re-use.

*Inward trunk calls (Figs. 3 and 4)*

When the relay register of Figs. 3 and 4 is used, in place of the condenser register of Figs. 1 and 2, the general method of operation is similar to that already described in the preceding section.

Thus, when the attendant comes in on a trunk, in response to a city call, the position circuit grounds lead KR as before, and this ground is extended to the keys of the keyset 100 by way of break contacts 4U—12. Assuming the call to be for the same local line as before, the attendant strikes the keys 2, 3, 2 on the keyset.

Responsive to the first operation of key 2 for the first digit, relay 303 of the 1st digit register operates from KR ground through the key, by way of break contacts 330—12, 320—12, and 310—12, and when the key is released, transfer relay 310 operates, in series with 303, from KR ground through 4S—12, the upper winding of 310, and locking contacts 303—1. Relay 310 thereupon disconnects the keyset from the relays 302 to 305 of the 1st digit register and connects it to the relays 322 to 325 of the 2nd digit register.

When key 3 is struck for the second digit, relay 324 operates from KR ground through the key, via break contacts 330—15 and 320—15, and make contacts 310—15. And upon the release of the key, transfer relay 320 operates in series with 424, from KR ground through break contacts 4U—12 and 4T—2, the lower winding of 320, and locking contacts 324—1. Relay 320 thereupon locks to KR temporarily over its upper winding and break contacts 330—4, and at the same time disconnects the keyset from the relays 322 to 325 of the 2nd digit register, and connects it to relays 332 to 335 of the 3rd digit register.

Accordingly, when key 2 is struck for the third digit, relay 333 operates, over break contacts 330—12 and make contacts 320—12. And upon release of the key, transfer 330 operates in series with 333, from KR ground through break contacts 4U—12 and 4T—12, winding of 330, and locking contacts 334—1. Relay 330 thereupon disconnects the keyset from the registers, and opens the locking circuit through the upper winding of relay 320, which is not otherwise affected.

Responsive to the original operation of relays 303 and 310, and assuming the marker to be free, the marker seizure circuit is closed to relays 4H and 4G. Relays 4H, 4G and GA operate in series in this circuit which is from KR ground through break contacts 4U—15, make contacts 310—2, break contacts 302—14, make contacts 303—14, lower winding of 4H, winding of 4G, rectifier RXG2 and lead 1GS. The marker prepares the operation of the code relays, and relay 4H operates marker relays SA and GM in series from ground at 4H—8, over make contacts 310—5 and lead SN. With ground through 100 ohms on lead P1 through contacts 302—17, 304—6, 4H—6 and 4S—7, and battery through 100 ohms on lead P2 through contacts 302—6, 303—6, 4H—4, and 4S—4, code relays 4N, 5N, 6N, 1N, 3N operate as before, and return ground over lead HS and contacts 4G—8 for the operation of relay 4S.

Register relay 4S upon operating, at 4S—12 locks to lead KR, and opens the series circuit through relays 310 and 303. Relay 303 releases quickly and relay 310 more slowly. If the second digit has not yet been registered however, relay 310 will hold temporarily, in the following circuit: KR ground, break contacts 4U—15, make contacts 310—2, break contacts 302—14 to 305—16, lower winding of 310, and break contacts 4T—15 and 320—2 to resistance battery. In either case, the release of relay 303 opens the circuit to relays 4H and 4G, whereupon these relays release and release the marker.

As soon as transfer relay 310 releases, relay 304 of the 1st digit register operates in parallel with the operated relay 324 of the 2nd digit register, from KR ground through break contacts 4U—12 and 4T—2, the lower winding of relay 320, and contacts 324—1, 324—11 and 310—15 to battery through relay 304. With relay 304 operated and 310 normal, a new seizure circuit to the marker is closed to relays 4H and 4G. If the marker is free relays 4H, 4G and GA reoperate in this circuit, which is from KR ground through break contacts 4U—15 and 310—2, make contacts 304—11 and 4S—14, upper winding of 4H, winding of 4G, and lead 1GS to the marker. Relay 4H thereupon at 4H—11 operates relay 4T in parallel with itself, at 4H—8 grounds the TN lead to the marker, and at 4H—6 and 4H—4 connects up the P1 and P2 leads. Relay 4T upon operating, at make before break contacts 4T—12 connects direct ground to the operated relay 330, at make contacts 4T—15 prepares the operation of relay 4U, at make contacts 4T—2 locks to KR ground through contacts 4U—12 and 4H—15, and at break contacts 4T—2 opens the original holding circuit for transfer relay 320. The latter relay is unaffected however, since it is now held operated through contacts 4H—13 and 4H—15 in series.

Responsive to the grounding of the TN lead from contacts 4H—8, by way of break contacts 310—5 and make contacts 320—5, marker relays TA and GM operate, and connect up the code relays N. Relay TA at the same time grounds lead AC to the register, which causes operation of the trunk switch allotter magnet, via contacts 4G—17 and lead ACA. With register relays 302, 303 and 305 normal and relay 304 operated there is no marking on the P1 and P2 leads from the register end, so that when marker relay GM operates, code relays N4, N5, N7, N2 and N3 operate and ground tens marking lead 30 to operate tens magnet 30 in the trunk switch. The trunk switch promptly returns ground through the trunk and position circuits to leads RCA and RC to operate marker relay GS. Relay GS thereupon frees the marker as before, and again releases 4G and 4H. Relay 4H in turn releases the operated relays 320, 324, and 304. If the third digit has not yet been registered however, relay 320 will be held over its upper winding following the release of 4H, and the register will wait. Relay 320, like relays 310 and 330 is made slightly slow to release to ensure the release of the digit registers.

Upon the release of transfer relay 320, under one condition or the other, relay 303 of the 1st digit register re-operates, in parallel with the operated relay 333 of the 3rd digit register, from direct ground through make contacts 4T—12, winding of the now operated transfer relay 330, and contacts 333—1, 330—12, 320—12 and 310—12 to battery through relay 303. Upon the operation of relay 303 the marker seizure circuit is again closed, through contacts 4U—15, 310—2, 303—11 and 4S—14, for the re-operation of relays 4H, 4G and GA. Relay 4H thereupon, at contacts 4H—8 grounds the UN lead to the marker, via break contacts 310—5 and 320—5, at 4H—6 and 4H—4 again connects up the P1 and P2 leads, and at contacts 4H—17 extends KR ground through the lower winding of relay 4U, make contacts 4T—15 and break contacts 320—2 to resistance battery. Relay 4U operates in this circuit and locks directly to KR ground through its upper winding. Relay 4U also at break contacts 4U—12 and 4U—15 opens points in the locking circuit of 4T and in the seizure circuit through 4H and 4G. Relay 4T remains operated however, as it is now held over make contacts 4H—15 and 4H—13. Relays 4H and 4G also remain operated from KR ground through make contacts 4H—17, rectifier RXU, and contacts 310—2, 303—11 and 4S—14.

Responsive to the grounding of the UN lead from contacts 4H—8, marker relays UA and GM operate, and connect up the code relays, with relay UA re-operating the trunk switch allotter magnet over lead AC to the register and thence over lead ACA. Code relays N4, N5, N6, N1, N3 then re-operate from the P1, P2 markings, and operate units magnet 2 in the trunk switch over the units marking lead 2. The trunk switch units magnet then returns ground over the RCA and RC leads to Fig. 5 for the operation of marker relay GS, which again frees the marker and releases 4G, 4H and 4T. Lead KT now tests the called line, which if idle operates the trunk ring start relays over contacts 4H—2, 4S—1, 4T—5, 4U—3, and 130—8 and lead KE. The position circuit then removes the ground from lead KR, and releases the register. If the line is busy, the position circuit will hold ground on lead KR. With 4T normal and 4U operated the circuit to transfer relay 330 is opened and the latter releases and closes the busy circuit, from ground through make contacts 4U—1, break contacts 330—2 and lead BY to the position circuit, which gives the busy signal to the attendant.

With this register, a first digit "1" is ineffective, due to the normally open contacts 4S—18. Once the first digit (other than "1") has been registered however, a subsequent digit "1" may be registered on the other digit registers, and passed to relay 302 of the first digit register in due course, over contacts 4S—18. If the first digit is a combination digit requiring the operation of two relays including 302, then relay 302 will operate through contacts 303—8, 304—3, or 305—13.

The operations of the relays 302 to 305 of the 1st digit register, and the corresponding P1 and P2 markings for the different digits, are as indicated in the first table following, while the corresponding operations of the marker code relays are as shown in the second table. The operations of the register relays 102 to 105 of the condenser register will correspond to those for the relays 302 to 305.

| Digit | Reg Rlys. | P1 | P2 |
|---|---|---|---|
| 1 | 302 | 100 ohm grd | Dir. grd. |
| 2 | 303 | 1 0 ohm grd | 100 ohm batt. |
| 3 | 304 | Open | Open. |
| 4 | 303, 304 | do | 100 ohm batt. |
| 5 | 302, 304 | do | Dir. grd. |
| 6 | 305 | Dir. grd. | Open. |
| 7 | 302, 305 | Dir. grd. | Dir. grd. |
| 8 | 303, 305 | Dir. grd. | 100 ohm batt. |
| 9 | 304, 305 | 100 ohm batt | Open. |
| 0 | 302, 303 | 100 ohm batt | 100 ohm batt. |

| Digit | Code Relays |
|---|---|
| 1 | N4, N5, N6, N1, N2 |
| 2 | N4, N5, N6, N1, N3 |
| 3 | N4, N5, N7, N2, N3 |
| 4 | N4, N5, N7, N1, N3 |
| 5 | N4, N5, N7, N1, N2 |
| 6 | N4, N6, N7, N2, N3 |
| 7 | N4, N6, N7, N1, N2 |
| 8 | N4, N6, N7, N1, N3 |
| 9 | N5, N6, N7, N2, N3 |
| 0 | N5, N6, N7, N1, N3 |

What is claimed is:

1. In a register sender for use in a telephone system, first and second digit registers, a plurality of individual operate conductors for each of said registers, means for setting said registers in turn to record the digits of a call number over their respective individual operate conductors, digit transmittal means for the first register, means for releasing said first register responsive to the transmittal of the digit recorded thereon, means responsive to said release for interconnecting the corresponding operate conductors of the first and second digit registers for re-operating said first register thereover from said second register, and means responsive to said re-operation for causing said first register to transmit the digit recorded on said second register.

2. In a register sender as in claim 1, a third digit register and means for setting the same, means responsive to the transmittal of the second recorded digit for releasing said first and second registers, means responsive to said last release for interconnecting the corresponding operate conductors of said first and third registers to re-operate said first register thereover from said third register, and means responsive to said last re-operation for causing said first register to transmit the digit recorded on said third register.

3. In a register sender as in claim 2, a transfer relay for each digit register, means for operating said relays in turn responsive to said recordings, means for releasing said relays in turn responsive to said transmittals, and contacts on said transfer relays for successively conditioning said registers for recording and for successively interconnecting said operate conductors responsive to said operations and releases of said transfer relays.

4. In a register sender as in claim 1, a pair of marking leads associated with said first digit register, and means whereby said first register causes the transmittal of said recorded digits by placing various polarity markings on one or both of said marking leads.

5. A register sender as in claim 4, wherein said polarity markings are derived from the positive and negative terminals of the system potentials, either direct or through a resistance.

6. Equipment for use in an automatic telephone system, comprising a plurality of digit registers, operate conductors for each register, a transfer relay for each register, a keyset normally connected to the operate conductors of a first one of said registers, means responsive to successive operations of said keyset for registering the digits of a call number successively on said registers over their respective operate conductors, means responsive to each said registration for operating the associated transfer relay to connect said keyset to the operate conductors of the next register, means for transmitting said registered digits in turn from said first register responsive to the successive registrations on the other registers, means responsive to said transmittals for successively releasing said transfer relays, and means responsive to each said release for causing one of said other registers to transfer the digit registered thereon to said first register for transmittal by connecting the operate conductors of said one register to those of said first register.

7. Telephone system equipment as in claim 6, including circuits for conditioning the successive release of said transfer relays upon the transmittal of the associated digit and the registration of the succeeding digit.

8. In telephone system equipment as in claim 6, circuits for making the release of said transfer relays responsive to the transmittal of the digit registered on the associated register or the registration of the succeeding digit on the next register, whichever comes last.

9. Equipment for use in an automatic telephone system comprising a plurality of digit registers, a transfer relay for each register, a group of storage relays for each register, operate circuits for said relays, a keyset normally connected to a first one of said registers, means responsive to successive operations of said keyset for storing the digits of a call number successively in said storage relay groups over said operate circuits, means responsive to each said group operation for operating the associated transfer relay in the operate circuits of said relay group to connect said keyset to the next register, means for transmitting said stored digits in turn from said first register responsive to the successive storages on the other registers, means responsive to said transmittals for successively releasing the corresponding group relays and the associated transfer relays, and means operated responsive to each such release for causing a succeeding register to transfer its stored digit to said first register over the operate circuits of the storage relays thereof to re-operate said first register correspondingly preparatory to transmittal of such digit thereby.

10. Telephone system equipment as in claim 9 including contacts on said transfer relays closed responsive to the operations thereof for successively connecting the operate circuits of the succeeding storage relay groups to said keyset, and contacts on said transfer relays closed responsive to the releases thereof for successively connecting the operate circuits of the succeeding storage relay groups to said first register for re-operating the storage relays thereof correspondingly.

11. Telephone switching equipment as in claim 9 including locking contacts on said storage relays, and means including said locking contacts for operating the associated transfer relay and for re-operating said first register from the succeeding registers.

12. In a register sender for use in an automatic telephone system, a first digit register comprising a group of relays, other digit registers each comprising a group of condensers, means for operating certain of said relays and charging certain of said condensers in the different registers in turn to store the digits of a call number therein, means for transmitting said stored digits in turn from said first register, and for releasing said register after each such transmittal, and means responsive to each said release for re-operating appropriate ones of the relays of said first register from the charged condensers of said other registers in turn, until all of the stored digits have been transmitted.

13. In a register sender as in claim 12, a transfer relay for each register, means for operating said transfer relays in turn responsive to the storing of the call number digits in the respective registers, means for releasing said transfer relays in turn responsive to the transmittal of the respective digits, charging circuits for said condenser registers for storing said digits therein, discharge circuits for said condenser registers for re-operating said relay register therefrom, and means responsive to the respective operations and releases of said transfer relays for respectively enabling said charging and discharge circuits.

14. In a register sender as in claim 12, a transfer relay for each register, means for operating said transfer relays in turn responsive to the storing of the call number digits in the respective registers, means for releasing said transfer relays in turn responsive to the transmittal of the respective digits, first discharge circuits for said condenser registers for operating the associated transfer relays, second discharge circuits for said condenser registers for re-operating said relay register therefrom, means responsive to the completion of the charges to said condenser registers for respectively enabling said first discharge circuits, and means responsive to the releases of said transfer relays for respectively enabling said second discharge circuits.

15. In a register sender as in claim 14, third discharge circuits for said condenser registers for draining residual charges from the respective condensers thereof, means for releasing said register sender responsive to completion of the transmittal of said call number thereby, and means responsive to said release of said register sender for enabling said third discharge circuits.

16. In a register sender for use in a telephone system, a first digit register comprising a group of storage relays less than ten in number and a transfer relay, other digit registers each comprising a like number of condensers and a transfer relay, a keyset normally connected to said first register, means for operating said storage and transfer relays and charging said condensers from said keyset for storing the digits of a call number in said registers, said storage relays and condensers being set in different combinations corresponding to the stored digits, contacts on said transfer relays responsive to the operations thereof for connecting the keyset to the next register, means for transmitting the stored digits from said first register and releasing the storage relays and the transfer relay corresponding to the transmitted digit responsive to each such transmittal, and contacts on said transfer relays responsive to the releases thereof for connecting said condenser groups in turn to said first register and re-operating the storage relays thereof from said condenser groups in corresponding combinations to enable the orderly transmittal of all of the stored digits from said first register.

17. A register sender as in claim 16, wherein said keyset comprises ten keys each representing a different digit, said relay register comprises four relays, said condenser registers each comprise four condensers, and said last relays and condensers are activated in corresponding combinations of one or two units, responsive to the respective operations of the keys of said keyset.

18. A register sender as in claim 16, wherein all of said condensers are of like capacitance.

19. In a register sender as in claim 16, means for releasing said register sender responsive to completion of transmittal of all of the stored digits, and means responsive to such release for completely discharging said condensers.

20. In a register sender as in claim 16, a key in said keyset for each of the ten digits, means responsive to each operation of one of said keys for activating the storage relays of the first register or the condensers of the other registers in the appropriate combinations, and means responsive to the release of such key for activating the transfer relay associated with such register.

21. Equipment for use in an automatic telephone system comprising subscriber lines and trunk lines, link circuits and trunk circuits, a crossbar connector switch for each link circuit and a crossbar trunk switch for each trunk circuit, an attendant's keyset, a register sender, a marker accessible in common to said link circuits and said register sender, means responsive to initiation of a call on any line for connecting said line to an idle link circuit, means for seizing and setting said marker from said link circuit responsive to receipt of dial pulses from the connected line, means responsive to said last operations for causing said marker to operate the link connector switch or a trunk switch to interconnect two subscriber lines or a subscriber line and a trunk line dependent on the digits dialed, means for setting said register sender from said keyset, means responsive to said setting for seizing and setting said marker from said register sender, and means responsive to said last operations for causing said marker to operate a trunk switch to interconnect the associated trunk line and any subscriber line dependent on the settings of said register sender and said marker.

22. In telephone system equipment as in claim 21, a group of code relays in said marker for operating said trunk and connector switches, a pair of marking leads for operating said code relays, and means in said register sender and in said link circuits for connecting different potentials to said leads for setting said code relays in different combinations for operating said trunk and connector switches according to the source of said markings and the setting of said code relays.

23. In telephone system equipment as in claim 21, tens and units magnets for said switches for completing said connections, tens and units marking leads common to said switches for operating said magnets from said marker, and means responsive to the setting of said code relays for connecting said marking leads to the magnets of a particular one of said switches for enabling the operation of the magnets thereof from said marker.

24. Telephone system equipment as in claim 23, wherein said last means comprises an allotter magnet on each of said switches with means for operating the same from said marker incident to the operation of the switch.

References Cited in the file of this patent

UNITED STATES PATENTS

| | | |
|---|---|---|
| 2,722,568 | Oden | Nov. 1, 1955 |
| 2,724,020 | Judy | Nov. 15, 1955 |
| 2,730,568 | Reagan | Jan. 10, 1956 |
| 2,740,003 | Newby | Mar. 27, 1956 |
| 2,764,634 | Brooks et al. | Sept. 25, 1956 |
| 2,767,248 | Warman | Oct. 16, 1956 |